No. 668,515. Patented Feb. 19, 1901.
W. H. GREEN & N. HERRIG.
COMBINED CORNSTALK CUTTER AND DROPPER.
(Application filed Nov. 15, 1900.)
(No Model.) 3 Sheets—Sheet 3.
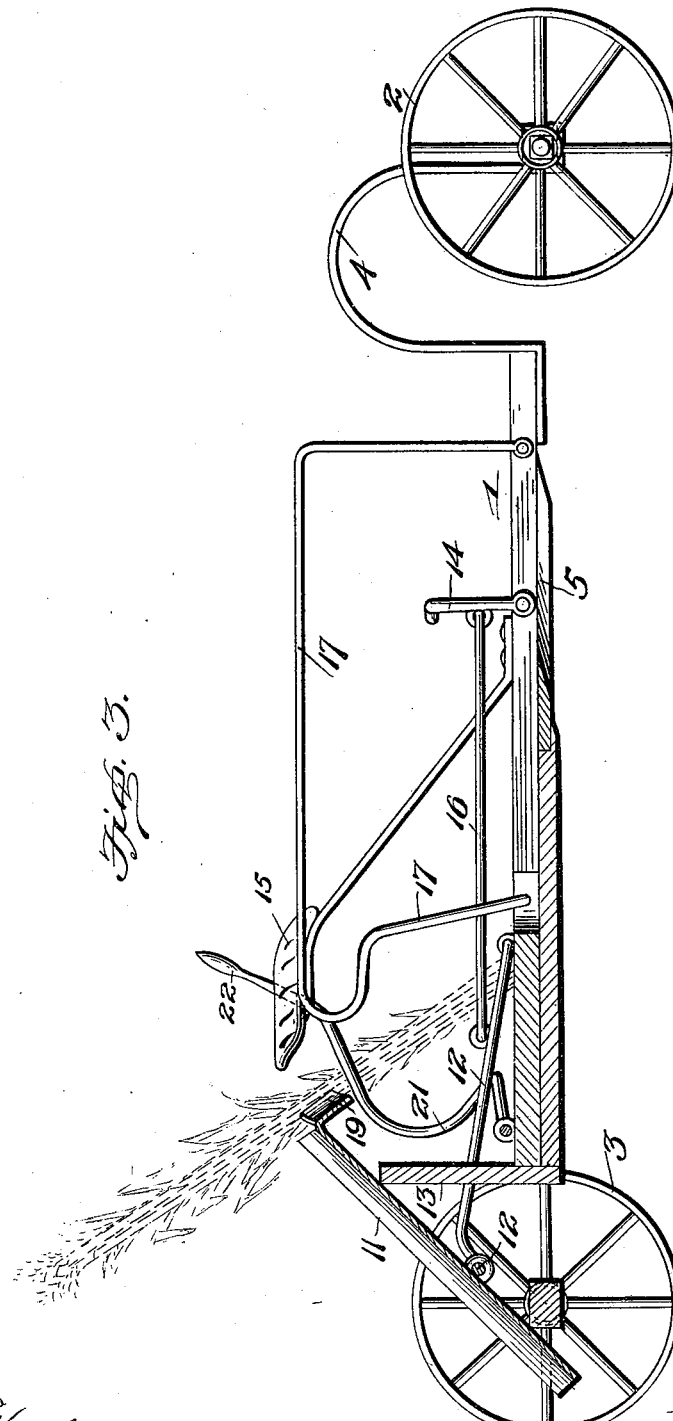
Witnesses
Inventors
William H Green
Nicholas Herrig
By 
Attorneys

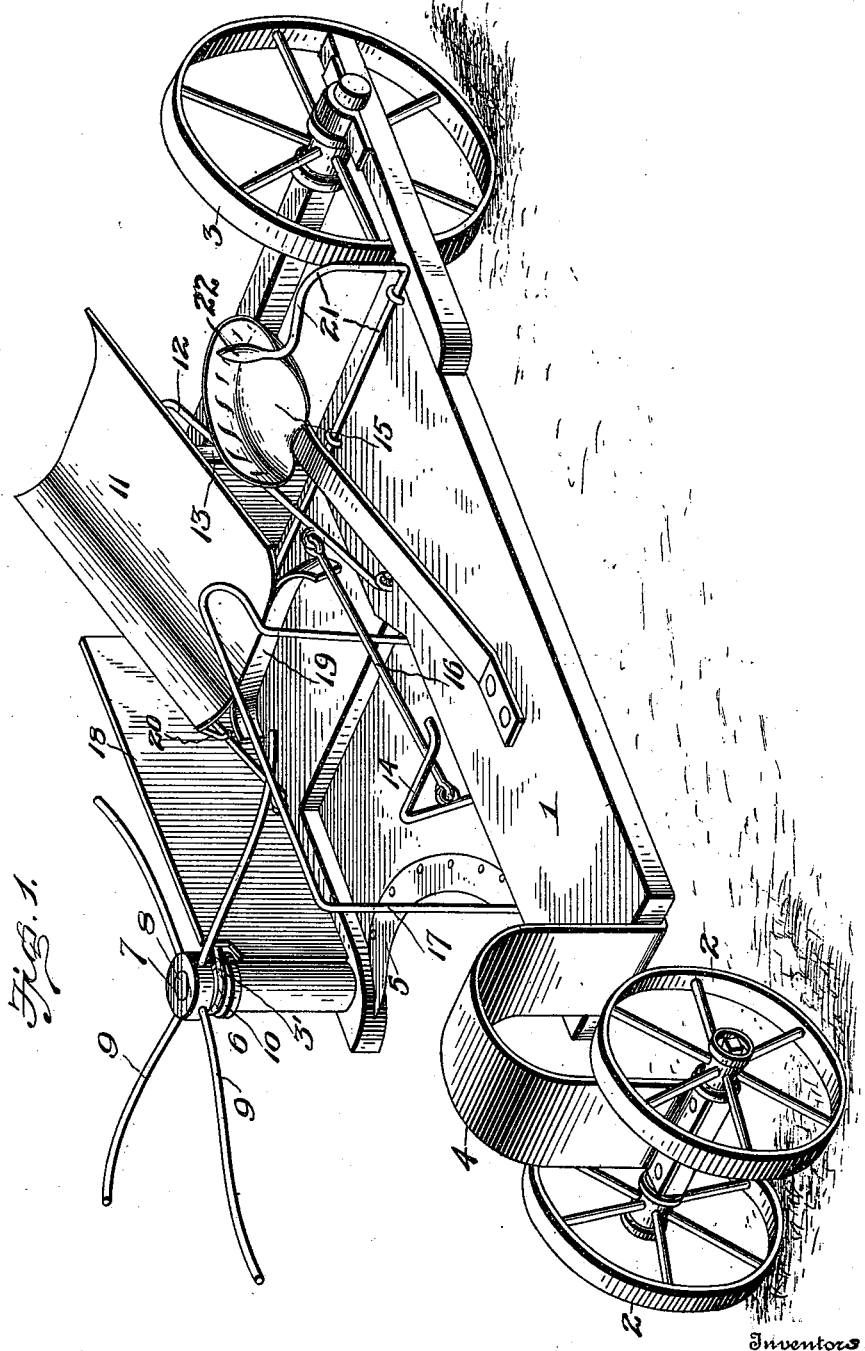

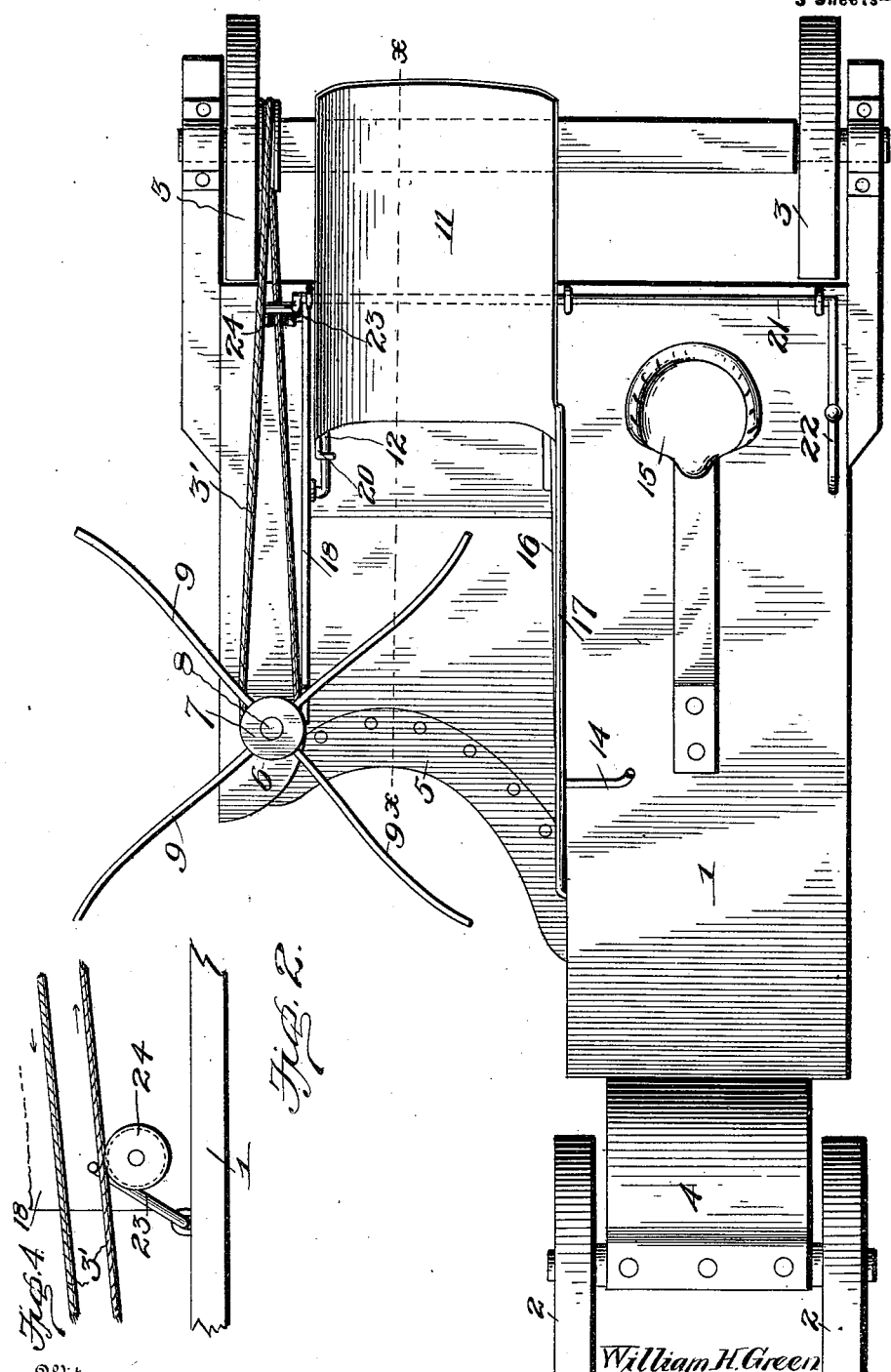

UNITED STATES PATENT OFFICE.

WILLIAM H. GREEN AND NICHOLAS HERRIG, OF LEAVENWORTH, KANSAS.

COMBINED CORNSTALK CUTTER AND DROPPER.

SPECIFICATION forming part of Letters Patent No. 668,515, dated February 19, 1901.

Application filed November 15, 1900. Serial No. 36,623. (No model.)

*To all whom it may concern:*

Be it known that we, WILLIAM H. GREEN and NICHOLAS HERRIG, citizens of the United States, residing at Leavenworth, in the county of Leavenworth and State of Kansas, have invented certain new and useful Improvements in a Combined Cornstalk Cutter and Dropper; and we do declare the following to be a full, clear, and exact description of the invention, such as will enable others skilled in the art to which it appertains to make and use the same.

The invention relates to a combined cornstalk cutter and dropper.

The object of the invention is to provide a device of this character which shall be simple of construction, durable in use, comparatively inexpensive of production, and extremely efficient in action.

With this and other objects in view the invention consists in certain features of construction and combination of parts, which will be hereinafter more fully set forth.

In the accompanying drawings, Figure 1 is a perspective view looking from the front at the left-hand side of the machine toward the rear and showing the dropper in its normal position or the position it occupies when receiving the cut stalks. Fig. 2 is a top plan view. Fig. 3 is a longitudinal sectional view on the line $x$ $x$, Fig. 2, showing the position the dropper assumes when it is desired to discharge the stalks therefrom and showing in dotted lines the position those stalks assume that have been severed during the dumping action of the dropper; and Fig. 4 is a fragmentary view illustrating the brake and its manner of application to the drive-belt, the latter being shown clamped to an idle pulley by the brake.

Referring to the drawings, 1 denotes the frame of the machine, which may be of any well-known or approved construction and is mounted upon wheels 2 and 3, the former set of which is connected to the forward end of the machine by a bowed spring 4.

5 denotes a stationary cutter which is secured to the forward end of the machine-frame and is arranged in the usual manner so as to have a drawing cut.

6 denotes a beater journaled to the frame of the machine at one side. This beater consists of a head 7, rotatably mounted upon a shaft 8 and provided with beater-arms 9 and a pulley 10, which is geared to one of the wheels 2 by a belt 3'. As the stalks are cut by the knife the beater-arms strike them and force them rearwardly.

11 denotes a dropper which is hinged to a bail 12 at one side of its center of gravity, and said bail has its arms hinged to the floor of the frame, as shown.

13 denotes a rest which projects upwardly from the rear end of the frame and supports the dropper.

14 denotes a foot-lever arranged adjacent to the driver's seat 15 and within convenient reach of the driver, and 16 denotes a link connecting said lever to one arm of the bail.

17 and 18 denote guard-rails for guiding the stalks to the dropper, and these rails may be of any well-known or approved construction.

19 denotes what we would term a "catcher," and consists, preferably, of a curved plate which may be formed of the same material as the dropper and is arranged at the lower end thereof and is preferably curved.

20 denotes a stop-finger or hook connected to one of the lower corners of the dropper and adapted to engage one of the side members of the bail and limit the movement of the dropper when swung into the position shown in Fig. 1.

21 denotes a brake-lever having a handle 22 within convenient reach of the driver and provided with a brake 23 at its other end, which is adapted to engage the drive-belt and clamp it against an idle pulley 24, thus controlling the rotation of the beater.

In operation, assuming the machine to be drawn along and the parts to be in the position shown in Fig. 1 of the drawings, as the cornstalks are cut they will be struck by the beater-arms and knocked rearwardly onto the inclined dropper. After the desired amount of stalks has been deposited upon the dropper the driver forces the foot-lever 14 rearward and tilts said dropper to the position shown in Fig. 3, thus allowing the cut stalks to fall off onto the ground. As the cut stalks are being discharged other stalks are being cut by the knife and knocked rearwardly by the beater-arms, and to catch these stalks and hold them in an upright position until the dropper has been returned to its normal position we provide the catcher, against which the stalks fall and are supported, as shown in Fig. 3 of the drawings. After the stalks have been discharged from the dropper the foot-lever is pressed forward to return the dropper to its normal position. In swinging the dropper forwardly suddenly the tendency would be for its lower end to swing between the sides of the bail, and to overcome this we provide the stop-finger or hook above referred to, which checks or limits the forward movement of the dropper. As the dropper is swung forwardly in its normal position those stalks which have been held in vertical position by the catcher are shifted onto the dropper and there remain until the dropper has received the desired load, when the operation of discharging is again repeated. By mounting the dropper on the bail at one side of the center of gravity it will remain either in the position shown in Fig. 1 or in that shown in Fig. 3 without any pressure of the foot. In the position shown in Fig. 1 the heavier end of the dropper is below its pivotal point, thus holding it in that position, and when in the position shown in Fig. 3 it will remain in that position, owing to the fact that the dropper slides downwardly upon its rest, thus bringing the heavier end of the dropper below its contact with the rest.

From the foregoing description, taken in connection with the accompanying drawings, the construction, operation, and advantages of our invention will be readily understood without requiring an extended explanation. The device is exceedingly useful for the purpose for which it is designed and may be placed upon the market at a comparatively small cost.

Various changes in the form, proportion, and the minor details of construction may be resorted to without departing from the principle or sacrificing any of the advantages of this invention.

Having thus fully described our invention, what we claim as new, and desire to secure by Letters Patent, is—

The combination of a wheel-supported frame, a knife carried by said frame to sever the stalks, a beater to force the severed stalks rearwardly, a bail hinged to the frame, a rest attached to the frame between the side arms of the bail, a dropper hinged to the bight of the bail and provided at its lower end with a curved catcher, and means for operating said dropper, substantially as set forth.

In testimony whereof we have hereunto set our hands in presence of two subscribing witnesses.

WILLIAM H. GREEN.
NICHOLAS HERRIG.

Witnesses:
HAROLD C. SHORT,
M. J. AARON.